US012627604B2

(12) United States Patent
Chen

(10) Patent No.: US 12,627,604 B2
(45) Date of Patent: May 12, 2026

(54) DATA PACKET TRANSMISSION METHODS AND DATA PACKET TRANSMISSION APPARATUS

(71) Applicant: Beijing Xiaomi Mobile Software Co., Ltd., Beijing (CN)

(72) Inventor: Dong Chen, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 228 days.

(21) Appl. No.: 18/274,796

(22) PCT Filed: Jan. 29, 2021

(86) PCT No.: PCT/CN2021/074404

§ 371 (c)(1),
(2) Date: Jul. 28, 2023

(87) PCT Pub. No.: WO2022/160246

PCT Pub. Date: Aug. 4, 2022

(65) Prior Publication Data

US 2023/0370376 A1 Nov. 16, 2023

(51) Int. Cl.
*H04L 45/745* (2022.01)
*H04L 45/00* (2022.01)
*H04L 45/02* (2022.01)

(52) U.S. Cl.
CPC ............ *H04L 45/745* (2013.01); *H04L 45/02* (2013.01); *H04L 45/38* (2013.01)

(58) Field of Classification Search
CPC ........ H04L 45/745; H04L 45/02; H04L 45/38
See application file for complete search history.

(56) References Cited

U.S. PATENT DOCUMENTS

| | | | |
|---|---|---|---|
| 2012/0106339 A1* | 5/2012 | Mishra | H04L 43/106 370/235 |
| 2018/0083856 A1 | 3/2018 | Wang et al. | |
| 2018/0109441 A1* | 4/2018 | Meyer | H04J 3/0667 |
| 2020/0305026 A1* | 9/2020 | Pang | H04L 47/283 |
| 2021/0014168 A1* | 1/2021 | Geng | H04L 45/121 |

FOREIGN PATENT DOCUMENTS

| | | |
|---|---|---|
| CN | 109905897 A | 6/2019 |
| CN | 110324242 A | 10/2019 |
| CN | 110677319 A | 1/2020 |

(Continued)

OTHER PUBLICATIONS

Energy Efficient Source Based Tree Routing With Time Stamp in WSN, 2014 International Conference on Signal Propagation and Computer Technology (ICSPCT), 2014 IEEE, Singh et al. (Year: 2014).*

(Continued)

*Primary Examiner* — Joseph G Ustaris
(74) *Attorney, Agent, or Firm* — Volpe Koenig

(57) ABSTRACT

A data packet transmission method, performed by a first device, includes: determining an Internet Protocol (IP) data packet. The IP data packet comprises a router identifier of a router for transmitting the IP data packet, and a first time corresponding to the router identifier. The first time is time when the router sends the IP data packet.

12 Claims, 4 Drawing Sheets

(56) References Cited

FOREIGN PATENT DOCUMENTS

CN      110708763  A   *   1/2020
CN      112019393  A       12/2020

OTHER PUBLICATIONS

ISA State Intellectual Property Office of the People's Republic of China, International Search Report Issued in Application No. PCT/CN2021/074404, Oct. 27, 2021, WIPO, 4 pages.
European Patent Office, Extended European Search Report Issued in Application No. 21921851.8, Jan. 4, 2024, Germany, 10 pages.
Singh Dharmendra et al:"Energy efficient source based tree routing with time stamp in WSN", XP032631370, 2014 International Conference on Signal Propagation and Computer Technology (ICSPCT 2014), IEEE, Jul. 12, 2014, 5 pages.
State Intellectual Property Office of the People's Republic of China, Office Action and Search Report Issued in Application No. 2021800004231, May 6, 2024, 11 pages.

* cited by examiner

| bit 0 | 4 | 8 | 16 | 19 | 24 | 31 |
|---|---|---|---|---|---|---|
| version | header length | differentiated service | total length | | | |
| identification | | | flag | | fragmentation offset | |
| lifetime | | protocol | header checksum | | | |
| source address | | | | | | |
| optional field (variable length) | | | | | pad | | fixed part

S11

Determine an IP data packet

S21

Send the IP data packet

S31

Receive an IP data packet

S41

Send the IP data packet based on the first time

100

101

102

Determining Module

Sending Module

400

DATA PACKET TRANSMISSION METHODS AND DATA PACKET TRANSMISSION APPARATUS

CROSS REFERENCE TO RELATED APPLICATIONS

This application is a National Stage of International Application No. PCT/CN2021/074404, filed on Jan. 29, 2021, the disclosure of which is incorporated herein by reference in its entirety for all purposes.

BACKGROUND

Internet Protocol (IP) is a protocol for information transmission between networks, and can transmit an IP data packet (also referred to as an IP information packet) from a source device (also referred to as a sending device) to a destination device (also referred to as a receiving device). In the process of transmitting the IP data packet from the source device to the destination device, the IP data packet is usually transmitted based on an IP address of the destination device and a network transmission mechanism of routers.

SUMMARY

The present disclosure relates to the technical field of wireless communication, and in particular to data packet transmission methods, data packet transmission apparatuses, and a storage medium.

According to a first aspect of the embodiments of the present disclosure, there is provided a data packet transmission method, performed by a first device, the method including: determining an Internet Protocol (IP) data packet; where the IP data packet includes a router identifier of a router for transmitting the IP data packet, and a first time corresponding to the router identifier, where the first time is time when the router sends the IP data packet.

According to a second aspect of the embodiments of the present disclosure, there is provided a data packet transmission method, performed by a second device, the method including: receiving an Internet Protocol (IP) data packet; where the IP data packet includes a router identifier of a router for transmitting the IP data packet, and a first time corresponding to the router identifier, where the first time is time when the router sends the IP data packet.

According to a third aspect of the embodiments of the present disclosure, there is provided a data packet transmission apparatus, including: a processor; and a memory configured to store executable instructions by the processor; the processor is configured to perform the data packet transmission method described in any implementation of the first aspect or the data packet transmission method described in any implementation of the second aspect.

According to a fourth aspect of the embodiments of the present disclosure, there is provided a non-transitory computer-readable storage medium, where instructions in the storage medium, when are executed by a processor of a mobile terminal, cause the mobile terminal to perform the data packet transmission method described in any implementation of the first aspect or the data packet transmission method described in any implementation of the second aspect.

It should be understood that the above general descriptions and subsequent detailed descriptions are merely illustrative and explanatory, and shall not constitute limitation to the present disclosure.

BRIEF DESCRIPTION OF THE DRAWINGS

The accompanying drawings herein, which are incorporated in and constitute a part of the specification, illustrate examples consistent with the present disclosure, and together with the specification, serve to explain the principles of the present disclosure.

DETAILED DESCRIPTION OF THE EMBODIMENTS

Exemplary embodiments will be described in detail herein, examples of which are illustrated in the accompanying drawings. When the following descriptions involve the drawings, like numerals in different drawings refer to like or similar elements unless otherwise indicated. Implementations described in the following exemplary embodiments do not represent all implementations consistent with the present disclosure. Rather, they are merely examples of apparatuses and methods consistent with some aspects of the present disclosure as detailed in the appended claims.

In communication technology, Internet Protocol (IP) is a protocol for information transmission between networks, and can transmit an IP data packet from a source device to a destination device. In the process of transmitting the IP data packet from the source device to the destination device, the IP data packet is usually transmitted based on an IP address of the destination device and a network transmission mechanism of routers.

The IP specifies that each device (for example, the source device or the destination device mentioned above) on an internet network must have a unique IP address. In other words, there is a one-to-one correspondence between IP addresses and devices. The IP data packet must include the IP address of the destination device, and the data packet is transmitted to the destination device according to the IP address in the data packet. Each device on the internet network can have a plurality of IP addresses, and each device has at least one unique IP address.

Additionally, the internet is a large network connected by many networks. If an IP data packet is to be transmitted between the internet, in addition to the above IP address of the destination device, there must be the network transmission mechanism of the routers. Through the network transmission mechanism of the routers, the IP data packet can be transmitted to the destination device by the plurality of routers. The network transmission mechanism of the routers can also be referred to as an IP routing transmission mechanism.

In related art, various networks are connected to each other through routers. The function of the routers is to select a transmission path for the IP data packet. The source device sends the IP data packet, and based on the network transmission mechanism of the routers, the routers select the transmission path for the IP data packet, and transmit the IP data packet to the destination device. That is, in the process of transmitting the IP data packet, the IP data packet is forwarded by the routers. For the source device, the transmission path of the IP data packet is unknown, and processing time of the IP data packet on each router cannot be determined. Therefore, after sending the IP data packet, the source device cannot determine the time when the IP data packet arrives at the destination device.

Figures 1, 2:
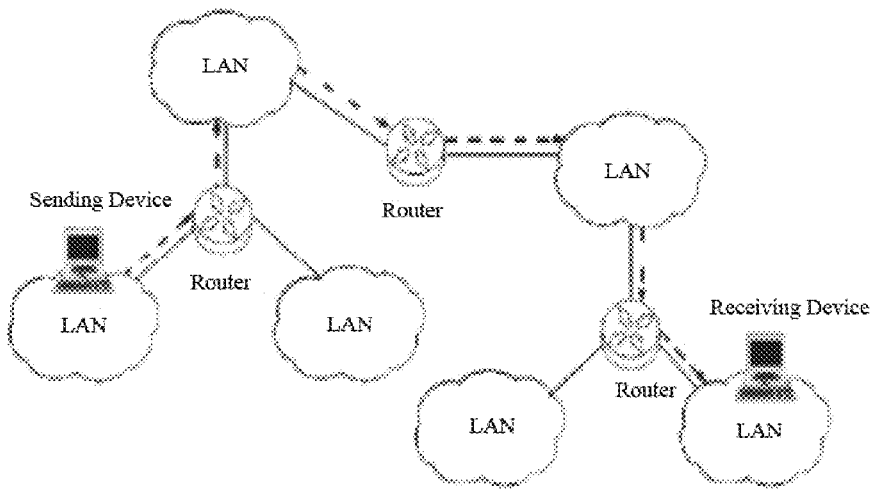
FIG. 1 is a diagram illustrating a system architecture for transmitting an IP data packet according to an exemplary embodiment of the present disclosure.
FIG. 2 is a schematic diagram illustrating a format of an IP data packet according to an exemplary embodiment of the present disclosure.

FIG. 1 is a diagram illustrating a system architecture for transmitting an IP data packet according to an exemplary embodiment of the present disclosure. A communication method provided in the present disclosure can be applied to the communication system architecture shown in FIG. 1. As shown in FIG. 1, a source or sending device (i.e., a source computer in FIG. 1) can send the IP data packet based on the architecture shown in FIG. 1, and the IP data packet can be transmitted to a destination or receiving device (i.e., a destination computer in FIG. 1) through a plurality of routers. As further shown in FIG. 1, individual LANs (Local Area Networks) are connected to each other through the routers, however the use of LANs is only exemplary and any type of network could be used.

FIG. 2 is a schematic diagram illustrating a format of an IP data packet according to an exemplary embodiment of the present disclosure. In related technologies, the IP data packet includes a source address and a destination address. The format is shown in FIG. 2, the IP data packet includes a fixed part, which includes a version, header length, differentiated service, total length, identification, flag, fragmentation offset, lifetime, protocol, header checksum, source address, and destination address. The IP data packet also includes one or more optional fields with a variable length, and a pad.

It can be seen that the IP data packet is forwarded by one or more routers during the transmission process after being sent by the source device. For the source device, a transmission path of the IP data packet is unknown, and the processing time of the IP data packet on each router cannot be determined. Therefore, after sending the IP data packet, the source device cannot determine the time when the IP data packet arrives at the destination device.

Based on this, the present disclosure provides a data packet transmission method, in which the source device determines one or more routers through which the IP data packet is transmitted, and determines absolute time (i.e., specific time) for each router to forward the IP data packet. Thereby the accurate time for the IP data packet arrives at the destination device is ensured.

It can be understood that the diagram of the system architecture for transmitting the IP data packet shown in FIG. 1 is only a schematic illustration. The wireless communication system may also include other network devices, such as one or more core network devices, one or more wireless relay devices, and one or more wireless backhaul devices, which are not shown in FIG. 1. The number of network devices and terminals included in the wireless communication system is not limited in the embodiments of the present disclosure.

It can be further understood that the wireless communication system in the embodiments of the present disclosure is a network that provides wireless communication functions. Different communication technologies can be adopted in the wireless communication system, such as code division multiple access (CDMA), wideband code division multiple access (WCDMA), time division multiple access (TDMA), frequency division multiple access (FDMA), orthogonal frequency division multiple access (OFDMA), single carrier FDMA (SC-FDMA), carrier sense multiple access with collision avoidance (CSMA/CA). According to the capacity, speed, delay, and other factors of different networks, the network type can be divided into 2G (generation) network, 3G network, 4G network, or future evolution network, such as 5G network which can also be referred to as new radio (NR) network. For the convenience of description, the wireless communication network is sometimes referred to as a network in the present disclosure.

Further, the network device involved in the present disclosure can also be referred to as a radio access network device. The radio access network device can be a base station, an evolved base station (evolved node B), a home base station, an access point (AP) in a wireless fidelity (WIFI) system, a wireless relay node, a wireless backhaul node, a transmission point (TP), or a transmission and reception point (TRP), and can also be a gNB in an NR system. Or, the radio access network device can be components or part of devices that constitute a base station. When the communication system is a vehicle-to-everything (V2X) communication system, the network device can also be a vehicle-mounted device. It should be understood that a specific technology and a specific device form adopted by the network device are not limited in embodiments of the present disclosure.

Further, the device involved in the present disclosure can also be referred to as a terminal device, a user equipment (UE), a mobile station (MS), a mobile terminal (MT), etc., it is a device that provides voice and/or data connectivity to the user. For example, the terminal can be a handheld device with a wireless connection function, a vehicle-mounted device with a wireless connection function, and the like. At present, some examples of the terminal are a mobile phone, a pocket personal computer (PPC), a handheld computer, a personal digital assistant (PDA), a laptop, a tablet, a wearable device, a vehicle-mounted device, etc. In addition, when the communication system is a vehicle-to-everything (V2X) communication system, the terminal device can also be a vehicle-mounted device. It should be understood that a specific technology and a specific device form adopted by the terminal are not limited in embodiments of the present disclosure.

Figures 3, 4, 5, 6, 7:
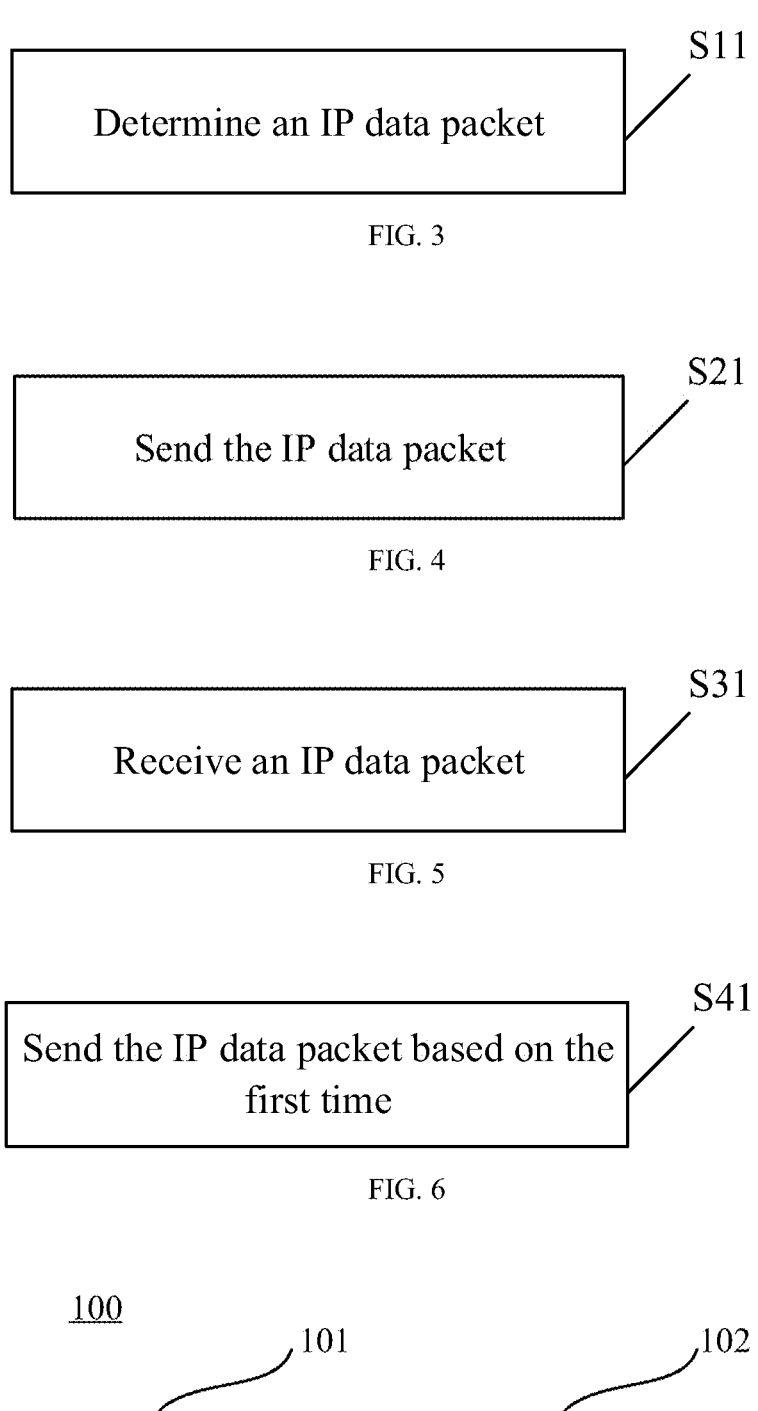
FIG. 3 is a flowchart illustrating a data packet transmission method according to an exemplary embodiment of the present disclosure.
FIG. 4 is a flowchart illustrating a data packet transmission method according to an exemplary embodiment of the present disclosure.
FIG. 5 is a flowchart illustrating a data packet transmission method according to an exemplary embodiment of the present disclosure.
FIG. 6 is a flowchart illustrating a data packet transmission method according to an exemplary embodiment of the present disclosure.
FIG. 7 is a block diagram illustrating a data packet transmission apparatus according to an exemplary embodiment of the present disclosure.

FIG. 3 is a flowchart illustrating a data packet transmission method according to an exemplary embodiment of the present disclosure. As shown in FIG. 3, the data packet transmission method is applied to a first device, and includes step S11.

In step S11, an Internet Protocol (IP) data packet is determined.

In the embodiment of the present disclosure, the IP data packet includes a router identifier of a router for transmitting the IP data packet, and a first time corresponding to the router identifier. The first time is time when the router sends the IP data packet.

In some embodiments of the present disclosure, the first device is a source device (also referred to as a sending device). The source device determines the IP data packet, and determines the router identifier of the router for transmitting the IP data packet and the first time corresponding to the router identifier.

The source device can be a network device such as a router, or a terminal such as a computer.

In the packet transmission method of the present disclosure, the source device determines the router identifier of the router for transmitting the IP data packet, and the first time corresponding to the router identifier, and places the router identifier and the first time in the IP data packet. Thus, the time when the IP data packet arrives at a destination device can be accurately controlled.

In an exemplary embodiment of the present disclosure, the first time can be absolute time. The absolute time can be determined based on a clock included in the network device, such as a global positioning system (GPS) clock. The absolute time can also be calculated and determined through a counter. The first time can also be time specified by other networks, which is not limited herein.

In the embodiment of the present disclosure, based on a time point of the network clock when the source device sends the IP data packet, counting is started from sending the IP data packet by the source device, and the router determines the time point corresponding to the first time by counting. In other words, through counting and the first time included in the IP data packet, the router determines the time point to send the IP data packet.

Illustratively, a router A that forwards an IP packet is taken as an example. The transit router A, corresponding to a first time A, determines a time point A corresponding to the first time A based on the counting from sending the IP data packet by the source device. The transit router A sends the IP data packet to a next router at the time point A. Thus, the time point at which each router sends the IP data packet can be determined in sequence, and the time point when the IP data packet arrives at the destination device can be determined, so as to determine the specific time when the IP data packet arrives at the destination device.

In an exemplary embodiment of the present disclosure, the router identifier can be a router address.

In some embodiments of the present disclosure, the router identifier refers to a plurality of router identifiers included in a routing flow table, and the plurality of router identifiers respectively correspond to the first time. The plurality of router identifiers correspond to a plurality of routers. In the embodiment of the present disclosure, for a respective router of the plurality of routers, the respective router forwards the IP data packet based on the corresponding first time and the router address of the next router.

For example, an IP data packet includes an IP address of a source device, an IP address of a destination device, router identifiers for transmitting the IP data packet, and a first time corresponding to the router identifiers. The router identifiers for transmitting the IP data packet can be placed in the IP data packet in the form of a routing flow table. The routing flow table includes a plurality of router addresses for transmitting the IP data packet. As mentioned above, each router address corresponds to the first time. For example, if the routing flow table includes N router addresses for transmitting the IP data packet, N router addresses correspond to the first time respectively. A router address A corresponds to a first time A; a router address B corresponds to a first time B; . . . ; and a router address N corresponds to a first time N.

In the embodiment of the present disclosure, the IP data packet is sent from the source device and transmitted in the order of the router addresses in the routing flow table. In an embodiment, the router address B is taken as an example. In response to the router address B receiving the IP data packet, the first time B corresponding to the router address B in the IP data packet and a next router address C are determined. After the IP data packet is processed at the router address B, the IP data packet is sent to the next hop (i.e., the next router address C) in the routing flow table at the first time B, until the IP data packet is transmitted to the destination address.

In an embodiment of the present disclosure, the IP data packet further includes a second time when a router corresponding to a previous router address of a destination IP address jumps to the destination IP address for transmitting the IP data packet. Further, the router corresponding to the previous router address of the destination IP address is actually the last router for transmitting the IP data packet.

In an embodiment, based on the first time corresponding to the last router address and the second time when the router corresponding to the previous router address of the destination IP address packet jumps to the destination IP address for transmitting the IP data packet, the time when the destination device corresponding to the destination address receives the IP data packet is determined.

In the data packet transmission method in the present disclosure, the specific time when each router in the routing flow table sends the IP data packet, and the second time when the router corresponding to the previous router address of the destination IP address jumps to the destination IP address for transmitting the IP data packet are determined in advance. Thus, the time when the IP data packet arrives at the destination device can be accurately controlled.

In an embodiment of the present disclosure, the IP data packet further includes hop count field information. In the embodiment of the present disclosure, the hop count field information includes a number of hops.

The number of hops includes a total number of hops between routers identified by the router identifiers, and a number of hops that the router corresponding to the previous router address of the destination IP address jumps to the destination IP address for transmitting the IP data packet. For example, if N router addresses are included in the routing flow table, then the number of hops included in the hop count field information is N+1. In other words, the hop count field information in the IP data packet is the field of N+1.

FIG. 4 is a flowchart illustrating a data packet transmission method according to an exemplary embodiment of the present disclosure. As shown in FIG. 4, the data packet transmission method is applied to the first device, and includes step S21.

In step S21, the IP data packet is sent to a router, or a destination device.

In the embodiment of the present disclosure, the source device determines the IP data packet and sends the IP data packet based on the router address of the next hop in the IP data packet.

Based on the same concept, there is further provided a data packet transmission method in an embodiment of the present disclosure.

FIG. 5 is a flowchart illustrating a data packet transmission method according to an exemplary embodiment of the present disclosure. As shown in FIG. 5, the packet transmission method is applied to a second device, and includes step S31.

In step S31, an Internet Protocol (IP) data packet is received.

In the embodiment of the present disclosure, the second device can be a device such as a router, or a destination device. The destination device can be a network device, or a terminal such as a computer.

In the embodiment of the present disclosure, the IP data packet includes a router identifier of a router for transmitting the IP data packet, and a first time corresponding to the router identifier. The first time is time when the router sends the IP data packet.

In the embodiment of the present disclosure, the source device determines the router identifier of the router for transmitting the IP data packet and the first time corresponding to the router identifier, and places the router identifier and the first time in the IP data packet. Thus, the time when the IP data packet arrives at the destination device can be accurately controlled.

FIG. 6 is a flowchart illustrating a data packet transmission method according to an exemplary embodiment of the present disclosure. As shown in FIG. 6, the data packet transmission method is applied to the second device and further includes step S41.

In step S41, the IP data packet is sent based on the first time.

In an exemplary embodiment of the present disclosure, the first time can be an absolute time. The absolute time can be determined based on a clock included in the network device, such as a global positioning system (GPS) clock. The absolute time can also be calculated and determined through a counter. The first time can also be time specified by other networks, which is not limited herein.

In the embodiment of the present disclosure, based on the time point of the network clock when the source device sends the IP data packet, counting is started from sending the IP data packet by the source device, and the router determines the time point corresponding to the first time by counting. In other words, through counting and the first time included in the IP data packet, the router determines the time point to send the IP data packet.

Illustratively, a router A that forwards an IP packet is taken as an example. The transit router A, corresponding to a first time A, determines a time point A corresponding to the first time A based on the counting from sending the IP data packet by the source device. The transit router A sends the IP data packet to a next router at the time point A. Thus, the time point at which each router sends the IP data packet can be determined in sequence, and the time point when the IP data packet arrives at the destination device can be determined, so as to determine the specific time when the IP data packet arrives at the destination device.

In an exemplary embodiment of the present disclosure, the router identifier can be a router address. In some embodiments of the present disclosure, the router identifier refers to a plurality of router identifiers included in a routing flow table, and the plurality of router identifiers respectively correspond to the first time. The plurality of router identifiers correspond to a plurality of routers.

In the embodiment of the present disclosure, for a respective router of the plurality of routers, it forwards the IP data packet based on the corresponding first time and the router address of the next router.

For example, an IP data packet includes an IP address of a source device, an IP address of a destination device, router identifiers for transmitting the IP data packet, and a first time corresponding to the router identifiers. The router identifiers for transmitting the IP data packet can be placed in the IP data packet in the form of a routing flow table. The routing flow table includes a plurality of router addresses for transmitting the IP data packet. As mentioned above, each router address corresponds to the first time. For example, if the routing flow table includes N router addresses for transmitting the IP data packet, N router addresses correspond to the first time respectively. A router address A corresponds to first time A; a router address B corresponds to first time B; . . . ; and a router address N corresponds to first time N.

In the embodiment of the present disclosure, the IP data packet is sent from the source device and transmitted in the order of router addresses in the routing flow table. In an embodiment, the router address B is taken as an example. In response to the router address B receiving the IP data packet, the first time B corresponding to the router address B in the IP data packet and a next router address C are determined. After the IP data packet is processed at the router address B, the IP data packet is sent to the next hop (i.e., the next router address C) in the routing flow table at the first time B, until the IP data packet is transmitted to the destination address.

In an embodiment of the present disclosure, the IP data packet further includes a second time when a router corresponding to a previous router address of a destination IP address jumps to the destination IP address for transmitting the IP data packet. Further, the router corresponding to the previous router address of the destination IP address is actually the last router for transmitting the IP data packet.

In an embodiment, based on the first time corresponding to the last router address for transmitting the IP data packet and the second time when the last router address for transmitting the IP data packet jumps to the destination IP address for transmitting the IP data packet, the time when the destination device corresponding to the destination address receives the IP data packet is determined.

In the data packet transmission method in the present disclosure, the specific time when each router in the routing flow table sends the IP data packet, and the second time when the router corresponding to the previous router address of the destination IP address jumps to the destination IP address for transmitting the IP data packet are determined in advance. Thus, the time when the IP data packet arrives at the destination device can be accurately controlled.

In the embodiment of the present disclosure, the IP data packet further includes hop count field information.

In the embodiment of the present disclosure, the hop count field information includes a number of hops. The number of hops includes a total number of hops between routers identified by the router identifiers, and a number of hops that the router corresponding to the previous router address of the destination IP address jumps to the destination IP address for transmitting the IP data packet. For example, if N router addresses are included in the routing flow table, the number of hops included in the hop count field information is N+1. In other words, the hop count field information in the IP data packet is the field of N+1.

Based on the same concept, there is further provided a data packet transmission apparatus in an embodiment of the present disclosure.

It can be understood that in order to realize the above functions, the data packet transmission apparatus provided in the embodiments of the present disclosure includes hardware structures and/or software modules for performing various functions. Combining units and algorithm steps of each example in the embodiments of the present disclosure, the embodiments of the present disclosure can be implemented in the form of hardware or a combination of hardware and computer software. Whether a certain function is executed in hardware or hardware driven by computer software depends on the specific application and design constraints of the technical solution. Those skilled in the art may use different methods to implement the described functions for each specific application, but such implementation should not be considered beyond the scope of the technical solution in the embodiments of the present disclosure.

FIG. 7 is a block diagram illustrating a data packet transmission apparatus 100 according to an exemplary embodiment of the present disclosure. Referring to FIG. 7, the data packet transmission apparatus 100 is applied to a first device, and includes a determining module 101 and a sending module 102.

The determining module 101 is configured to determine an Internet Protocol (IP) data packet. The IP data packet includes a router identifier of a router for transmitting the IP data packet, and a first time corresponding to the router identifier. The first time is time when the router sends the IP data packet.

In an embodiment of the present disclosure, the first time is absolute time.

In an embodiment of the present disclosure, the router identifier is a router address. In an embodiment of the present disclosure, the router identifier refers to a plurality of router identifiers included in a routing flow table, and the plurality of router identifiers respectively correspond to the first time.

In an embodiment of the present disclosure, the IP data packet further includes second time when a router corresponding to a previous router address of a destination IP address jumps to the destination IP address for transmitting the IP data packet.

In an embodiment of the present disclosure, the IP data packet further includes hop count field information. The hop count field information includes a number of hops. The number of hops includes a total number of hops between routers identified by the router identifiers, and a number of hops that the router corresponding to the previous router address of the destination IP address jumps to the destination IP address for transmitting the IP data packet.

In an embodiment of the present disclosure, the data packet transmission apparatus 100 further includes a sending module 102. The sending module 102 is configured to send the IP data packet.

Figure 8:
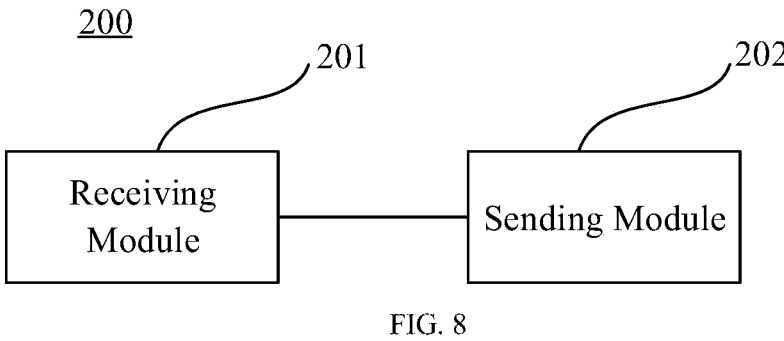
FIG. 8 is a block diagram illustrating a data packet transmission apparatus according to an exemplary embodiment of the present disclosure.

FIG. 8 is a block diagram illustrating a data packet transmission apparatus 200 according to an exemplary embodiment of the present disclosure. Referring to FIG. 8, the data packet transmission apparatus 200 is applied to a second device, and includes a receiving module 201 and a sending module 202.

The receiving module 201 is configured to receive an Internet Protocol (IP) data packet. The IP data packet includes a router identifier of a router for transmitting the IP data packet, and a first time corresponding to the router identifier. The first time is time when the router sends the IP data packet.

In an embodiment of the present disclosure, the data packet transmission apparatus 200 further includes a sending module 202. The sending module 202 is configured to send the IP data packet based on the first time.

In an embodiment of the present disclosure, the first time is absolute time.

In an embodiment of the present disclosure, the router identifier is a router address. In an embodiment of the present disclosure, the router identifier refers to a plurality of router identifiers included in a routing flow table, and the plurality of router identifiers respectively correspond to the first time.

In an embodiment of the present disclosure, the IP data packet further includes a second time when a router corresponding to a previous router address of a destination IP address jumps to the destination IP address for transmitting the IP data packet.

In an embodiment of the present disclosure, the IP data packet further includes hop count field information. The hop count field information includes a number of hops. The number of hops includes a total number of hops between routers identified by the router identifiers, and a number of hops that the router corresponding to the previous router address of the destination IP address jumps to the destination IP address for transmitting the IP data packet.

With regard to the apparatus in the above embodiment, the specific manner in which each module performs operations have been described in detail in the method embodiments, and will not be explained in detail herein.

Figure 9:
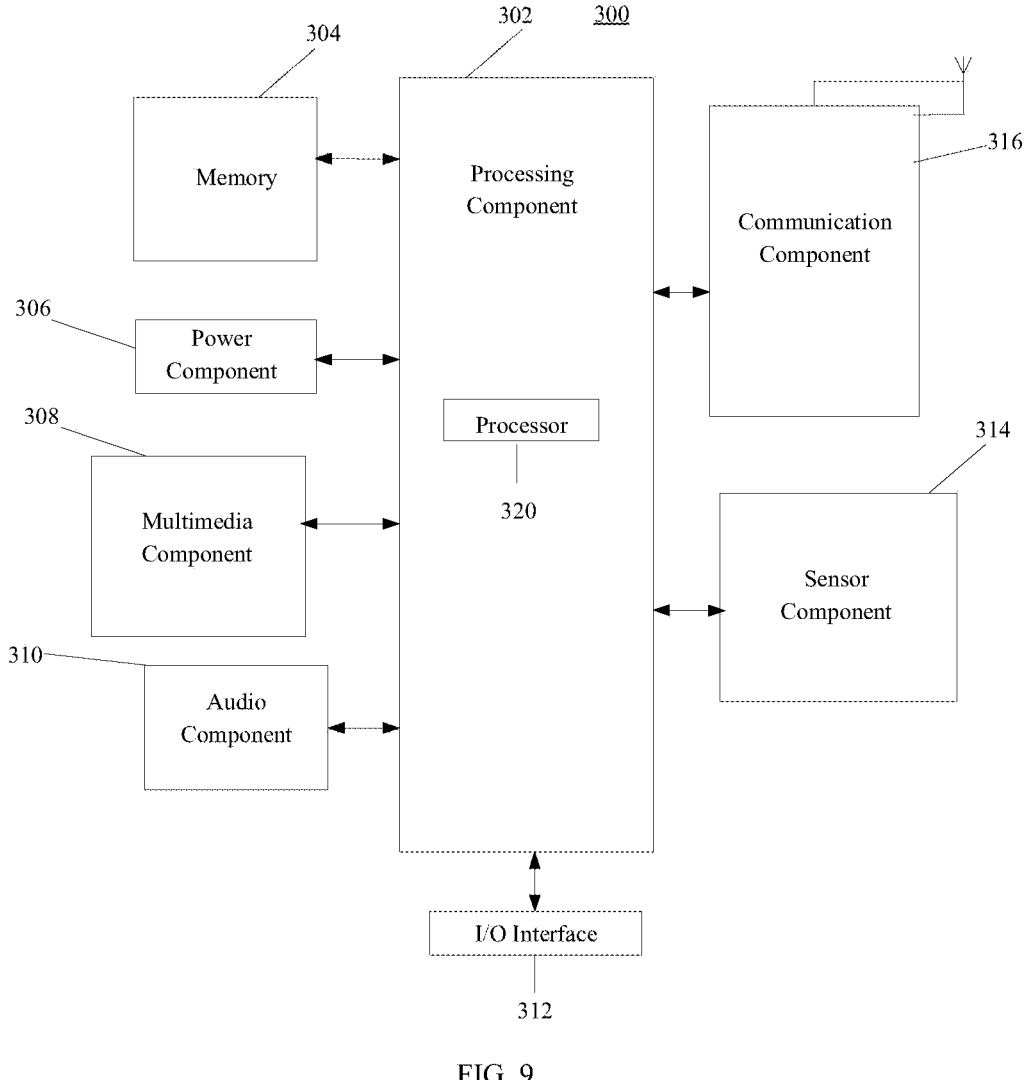
FIG. 9 is a block diagram illustrating an apparatus for data packet transmission according to an exemplary embodiment of the present disclosure.

FIG. 9 is a block diagram of an apparatus 300 for transmitting a data packet according to an exemplary embodiment. For example, the apparatus 300 may be a mobile phone, a computer, a digital broadcasting terminal, a message transceiver device, a game console, a tablet device, a medical device, a fitness device, and a personal digital assistant.

Referring to FIG. 9, the apparatus 300 may include one or more of the following components: a processing component 302, a memory 304, a power component 306, a multimedia component 308, an audio component 310, an input/output (I/O) interface 312, a sensor component 314, and a communication component 316.

The processing component 302 typically controls overall operations of the apparatus 300, such as the operations associated with display, telephone calls, data communications, camera operations, and recording operations. The processing component 302 may include one or more processors 320 to execute instructions, so as to perform all or part of the steps in the above described method. Moreover, the processing component 302 may include one or more modules which facilitate the interaction between the processing component 302 and other components. For example, the processing component 302 may include a multimedia module to facilitate the interaction between the multimedia component 308 and the processing component 302.

The memory 304 is configured to store various types of data to support the operation of the apparatus 300. Examples of such data include instructions for any application or method operated on the apparatus 300, contact data, phonebook data, messages, pictures, video, etc. The memory 304 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a programmable read-only memory (PROM), a Read-Only Memory (ROM), a magnetic memory, a flash memory, a magnetic or optical disk.

The power component 306 provides power to various components of the apparatus 300. The power component 306 may include a power management system, one or more power sources, and any other components associated with the generation, management, and distribution of power for the apparatus 300.

The multimedia component 308 includes a screen providing an output interface between the apparatus 300 and the user. In some embodiments, the screen may include a Liquid Crystal Display (LCD) and a Touch Panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense duration and a pressure associated with the touch or swipe action. In some embodiments, the multimedia component 308 includes a front-facing camera and/ or a rear-facing camera. When the apparatus 300 is in an operating mode, such as a shooting mode or a video mode, the front-facing camera and/or the rear-facing camera can receive external multimedia data. Each front-facing camera and rear-facing camera may be a fixed optical lens system or has focal length and optical zoom capability.

The audio component 310 is configured to output and/or input audio signals. For example, the audio component 310 includes a microphone (MIC) configured to receive an external audio signal when the apparatus 300 is in an operation mode, such as a call mode, a recording mode, and a voice recognition mode. The received audio signal may be further stored in the memory 304 or transmitted via the communication component 316. In some embodiments, the audio component 310 further includes a speaker configured to output audio signals.

The I/O interface 312 provides an interface between the processing component 302 and peripheral interface modules, such as a keyboard, a click wheel, buttons, and the like. The buttons may include, but are not limited to, a home button, a volume button, a starting button, and a locking button.

The sensor component 314 includes one or more sensors configured to provide status assessments of various aspects of the apparatus 300. For instance, the sensor component 314 may detect an open/closed status of the apparatus 300, relative positioning of components, e.g., the display and the keypad of the apparatus 300. The sensor component 314 may also detect a change in position of the apparatus 300 or a component of the apparatus 300, the presence or absence of contact between the user and apparatus 300, an orientation or an acceleration/deceleration of the apparatus 300, and a change in temperature of the apparatus 300. The sensor component 314 may include a proximity sensor configured to detect the presence of nearby objects without any physical contact. The sensor component 314 may also include a light sensor, such as a CMOS or CCD image sensor, for use in imaging applications. In some embodiments, the sensor component 314 may also include an accelerometer sensor, a gyroscope sensor, a magnetic sensor, a pressure sensor, or a temperature sensor.

The communication component 316 is configured to facilitate communication, wired or wirelessly, between the apparatus 300 and other devices. The apparatus 300 can access a wireless network based on a communication standard, such as WiFi, 2G, or 3G, or a combination thereof. In an exemplary embodiment, the communication component 316 receives a broadcast signal or broadcast associated information from an external broadcast management system via a broadcast channel. In an exemplary embodiment, the communication component 316 further includes a near field communication (NFC) module to facilitate short-range communication. For example, the NFC module may be implemented based on a radio frequency identity (RFID) technology, an infrared data association (IrDA) technology, an ultra-wideband (UWB) technology, a Bluetooth (BT) technology, and other technologies.

In exemplary embodiments, the apparatus 300 may be implemented with one or more application specific integrated circuits (ASICs), digital signal processors (DSPs), digital signal processing devices (DSPDs), programmable logic devices (PLDs), field programmable gate arrays (FP-GAs), controllers, micro-controllers, microprocessors, or other electronic components, for performing the above methods.

In exemplary embodiments, there is also provided a non-transitory computer readable storage medium including instructions, such as the memory 304 including instructions, executable by the processors 320 in the apparatus 300 for performing the above methods. For example, non-transitory computer-readable storage medium may be a ROM, a RAM, a CD-ROM, a magnetic tape, a floppy disc, an optical data storage device, and the like.

Figure 10:
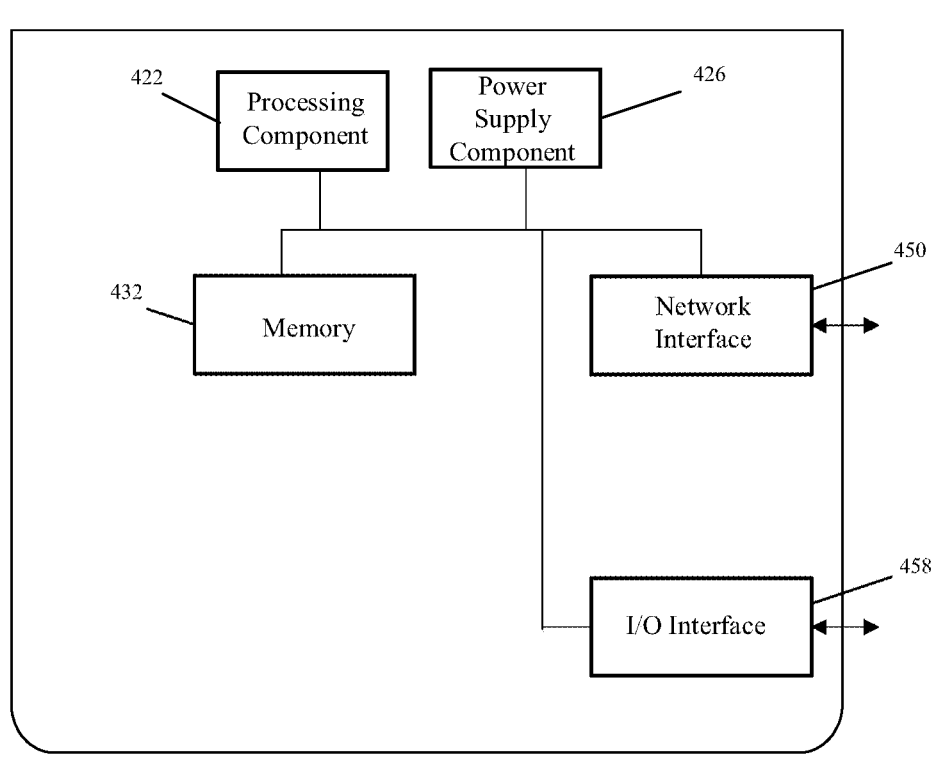
FIG. 10 is a block diagram illustrating an apparatus for data packet transmission according to an exemplary embodiment of the present disclosure.

FIG. 10 is a block diagram of an apparatus 400 for transmitting a data packet according to an exemplary embodiment. For example, the apparatus 400 can be provided as a server. Referring to FIG. 10, the apparatus 400 includes a processing component 422, which further includes one or more processors (not shown), and memory resources represented by a memory 432, for storing instructions that can be executed by the processing component 422, such as application programs. The application programs stored in the memory 432 may include one or more modules each corresponding to a set of instructions. In addition, the processing component 422 is configured to execute instructions to perform the above data packet transmission methods.

The apparatus 400 may also include a power supply component 426 configured to perform power management of the apparatus 400, a wired or wireless network interface 450 configured to connect the apparatus 400 to the network, and an input output (I/O) interface 458. The apparatus 400 can operate operating systems stored in the memory 432, such as Windows Server™, Mac OS X™, Unix™, Linux™, FreeBSD™, or similar.

It can be further understood that in the present disclosure, "multiple" refers to two or more, and other quantifiers are similar to it. "and/or" describes an association relationship of associated objects, indicating that there can be three types of relationships. For example, A and/or B, which can mean that the existence of A alone, the existence of A and B simultaneously, and the existence of B alone. The character "/" generally indicates that there is an "or" relationship between the context objects. The singular forms "a", "this", and "the" are also intended to include the plural form, unless the context clearly indicates other meanings.

It can be further understood that the terms "first", "second", etc. are used to describe various information, but the information should not be limited to these terms. These terms are only used to distinguish the same type of information from each other and do not indicate a specific order or degree of importance. In fact, expressions such as "first" and "second" can be used interchangeably. For example, without departing from the scope of the present disclosure, the first information can also be referred to as the second information, and similarly, the second information can also be referred to as the first information.

It can be further understood that in the embodiments of the present disclosure, although the operations are described in a specific order in the accompanying drawings, they should not be understood as requiring that these operations be performed in the specific order or serial order shown, or that all the operations shown should be performed to obtain the desired results. In certain circumstances, multitasking and parallel processing may be advantageous.

Other embodiments of the present disclosure will be apparent to those skilled in the art from consideration of the specification and practice of the present disclosure disclosed herein. The present disclosure is intended to cover any variations, uses, or adaptations of the present disclosure following the general principles thereof and including common knowledge or common technical means in the technical field that are not disclosed in the present disclosure. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

According to an of the embodiments of the present disclosure, there is provided a data packet transmission method, performed by a first device, the method including: determining an Internet Protocol (IP) data packet; where the IP data packet includes a router identifier of a router for transmitting the IP data packet, and a first time corresponding to the router identifier, where the first time is time when the router sends the IP data packet.

In an embodiment, the first time is absolute time.

In an embodiment, the router identifier is a router address.

In an embodiment, the router identifier refers to a plurality of router identifiers included in a routing flow table, and the plurality of router identifiers respectively correspond to the first time.

In an embodiment, the IP data packet further includes second time when a router corresponding to a previous router address of a destination IP address jumps to the destination IP address for transmitting the IP data packet.

In an embodiment, the IP data packet further includes hop count field information; the hop count field information includes a number of hops; the number of hops includes a total number of hops between routers identified by the router identifiers, and a number of hops that the router corresponding to the previous router address of the destination IP address jumps to the destination IP address for transmitting the IP data packet.

In an embodiment, the method further includes: sending the IP data packet.

According to an aspect of the embodiments of the present disclosure, there is provided a data packet transmission method, performed by a second device, the method including: receiving an Internet Protocol (IP) data packet; where the IP data packet includes a router identifier of a router for transmitting the IP data packet, and a first time corresponding to the router identifier, where the first time is time when the router sends the IP data packet.

In an embodiment, the method further includes: sending the IP data packet based on the first time.

In an embodiment, the first time is absolute time.

In an embodiment, the router identifier is a router address.

In an embodiment, the router identifier refers to a plurality of router identifiers included in a routing flow table, and the plurality of router identifiers respectively correspond to the first time.

In an embodiment, the IP data packet further includes a second time when a router corresponding to a previous router address of a destination IP address jumps to the destination IP address for transmitting the IP data packet.

In an embodiment, the IP data packet further includes hop count field information; the hop count field information includes a number of hops; where the number of hops includes a total number of hops between routers identified by the router identifiers, and a number of hops that the router corresponding to the previous router address of the destination IP address jumps to the destination IP address for transmitting the IP data packet.

According to an aspect of the embodiments of the present disclosure, there is provided a data packet transmission apparatus, performed by a first device, the apparatus includes: a determining module, configured to determine an Internet Protocol (IP) data packet; where the IP data packet includes a router identifier of a router for transmitting the IP data packet, and a first time corresponding to the router identifier, where the first time is time when the router sends the IP data packet.

In an embodiment, the first time is absolute time.

In an embodiment, the router identifier is a router address.

In an embodiment, the router identifier refers to a plurality of router identifiers included in a routing flow table, and the plurality of router identifiers respectively correspond to the first time.

In an embodiment, the IP data packet further includes a second time when a router corresponding to a previous router address of a destination IP address jumps to the destination IP address for transmitting the IP data packet.

In an embodiment, the IP data packet further includes hop count field information; the hop count field information includes a number of hops; the number of hops includes a total number of hops between routers identified by the router identifiers, and a number of hops that the router corresponding to the previous router address of the destination IP address jumps to the destination IP address for transmitting the IP data packet.

In an embodiment, the apparatus further includes: a sending module configured to send the IP data packet.

According to an aspect of the embodiments of the present disclosure, there is provided a data packet transmission apparatus, performed by a second device, the method including: a receiving module, configured to receive an Internet Protocol (IP) data packet; where the IP data packet includes a router identifier of a router for transmitting the IP data packet, and a first time corresponding to the router identifier, where the first time is time when the router sends the IP data packet.

In an embodiment, the apparatus further includes: a sending module configured to send the IP data packet based on the first time.

In an embodiment, the first time is absolute time.

In an embodiment, the router identifier is a router address.

In an embodiment, the router identifier refers to a plurality of router identifiers included in a routing flow table, and the plurality of router identifiers respectively correspond to the first time.

In an embodiment, the IP data packet further includes a second time when a router corresponding to a previous router address of a destination IP address jumps to the destination IP address for transmitting the IP data packet.

In an embodiment, the IP data packet further includes hop count field information; the hop count field information includes a number of hops; where the number of hops includes a total number of hops between routers identified by the router identifiers, and a number of hops that the router corresponding to the previous router address of the destination IP address jumps to the destination IP address for transmitting the IP data packet.

According to an aspect of the embodiments of the present disclosure, there is provided a data packet transmission apparatus, including: a processor; and a memory configured to store executable instructions by the processor; the processor is configured to perform the data packet transmission method described in any implementation.

According to an aspect of the embodiments of the present disclosure, there is provided a non-transitory computer-readable storage medium, where instructions in the storage medium, when are executed by a processor of a mobile terminal, cause the mobile terminal to perform the data packet transmission method described in any implementation.

The invention claimed is:

1. A data packet transmission method, performed by a first device, the method comprising:

determining an Internet Protocol (IP) data packet, wherein the IP data packet comprises a router identifier of a router for transmitting the IP data packet, and a first time corresponding to the router identifier, and wherein the first time is a predetermined absolute time when the router sends the IP data packet; wherein after receiving and processing the IP data packet, the router sends the IP data packet to a next hop in a routing flow table at the first time;

wherein the router identifier refers to a plurality of router identifiers included in the routing flow table, the routing flow table further comprises an order of the plurality of router identifiers, and the plurality of router identifiers respectively correspond to the first time, wherein the plurality of router identifiers correspond to a plurality of routers;

wherein the IP data packet further comprises a predetermined second time when a router corresponding to a previous router address of a destination IP address jumps to the destination IP address for transmitting the IP data packet.

2. The method according to claim 1, wherein the router identifier is a router address.

3. The method according to claim 1, wherein the IP data packet further comprises hop count field information;

the hop count field information comprises a number of hops; and the number of hops comprises a total number of hops between routers identified by the router identifiers, and a number of hops that the router corresponding to the previous router address of the destination IP address jumps to the destination IP address for transmitting the IP data packet.

4. The method according to claim 1, further comprising: sending the IP data packet.

5. A data packet transmission method, performed by a second device, the method comprising:

receiving an Internet Protocol (IP) data packet, wherein the IP data packet comprises a router identifier of a router for transmitting the IP data packet, and a first time corresponding to the router identifier, and wherein the first time is a predetermined absolute time when the router sends the IP data packet; wherein after receiving and processing the IP data packet, the router sends the IP data packet to a next hop in a routing flow table at the first time;

wherein the router identifier refers to a plurality of router identifiers included in the routing flow table, the routing flow table further comprises an order of the plurality of router identifiers, and the plurality of router identifiers respectively correspond to the first time, wherein the plurality of router identifiers correspond to a plurality of routers;

wherein the IP data packet further comprises a predetermined second time when a router corresponding to a previous router address of a destination IP address jumps to the destination IP address for transmitting the IP data packet.

6. The method according to claim 5, further comprising: sending the IP data packet based on the first time.

7. The method according to claim 6, wherein the router identifier is a router address.

8. The method according to claim 5, wherein the IP data packet further comprises hop count field information;

the hop count field information comprises a number of hops; and the number of hops comprises a total number of hops between routers identified by the router identifiers, and a number of hops that the router corresponding to the previous router address of the destination IP address jumps to the destination IP address for transmitting the IP data packet.

9. A data packet transmission apparatus, comprising:

a processor; and a memory configured to store instructions; wherein the instructions when executed by the processor, cause the data packet transmission apparatus to:

determine an Internet Protocol (IP) data packet, wherein the IP data packet comprises a router identifier of a router for transmitting the IP data packet, and a first time corresponding to the router identifier, and wherein the first time is a predetermined absolute time when the router sends the IP data packet; wherein after receiving and processing the IP data packet, the router sends the IP data packet to a next hop in a routing flow table at the first time;

wherein the router identifier refers to a plurality of router identifiers included in the routing flow table, the routing flow table further comprises an order of the plurality of router identifiers, and the plurality of router identifiers respectively correspond to the first time, wherein the plurality of router identifiers correspond to a plurality of routers;

wherein the IP data packet further comprises a predetermined second time when a router corresponding to a previous router address of a destination IP address jumps to the destination IP address for transmitting the IP data packet.

10. A data packet transmission apparatus, comprising:

a processor; and a memory configured to store instructions, and wherein the instructions when executed by the processor, cause the data packet transmission apparatus to perform the data packet transmission method according to claim 5;

wherein the method is performed by the second device, the method comprising:

receiving an Internet Protocol (IP) data packet, wherein the IP data packet comprises a router identifier of a router for transmitting the IP data packet, and a first time corresponding to the router identifier, and wherein the first time is predetermined absolute time when the router sends the IP data packet; wherein after receiving and processing the IP data packet, the router sends the IP data packet to a next hop in a routing flow table at the first time;

wherein the router identifier refers to a plurality of router identifiers included in the routing flow table, the routing flow table further comprises an order of the plurality of router identifiers, and the plurality of router identifiers respectively correspond to the first time, wherein the plurality of router identifiers correspond to a plurality of routers;

wherein the IP data packet further comprises a predetermined second time when a router corresponding to a previous router address of a destination IP address jumps to the destination IP address for transmitting the IP data packet.

11. A non-transitory computer-readable storage medium including instructions, the instructions when executed by a processor of a mobile terminal, cause the mobile terminal to perform the data packet transmission method according to claim 1;

wherein the method is performed by the first device, the method comprising:

determining an Internet Protocol (IP) data packet, wherein the IP data packet comprises a router identifier of a router for transmitting the IP data packet, and a first time corresponding to the router identifier, and wherein the first time is predetermined absolute time when the router sends the IP data packet; wherein after receiving and processing the IP data packet, the router sends the IP data packet to a next hop in a routing flow table at the first time;

wherein the router identifier refers to a plurality of router identifiers included in the routing flow table, the routing flow table further comprises an order of the plurality of router identifiers, and the plurality of router identifiers respectively correspond to the first time, wherein the plurality of router identifiers correspond to a plurality of routers;

wherein the IP data packet further comprises a predetermined second time when a router corresponding to a previous router address of a destination IP address jumps to the destination IP address for transmitting the IP data packet.

12. A non-transitory computer-readable storage medium including instructions, the instructions when executed by a processor of a mobile terminal, cause the mobile terminal to perform the data packet transmission method according to claim 5;

wherein the method is performed by the second device, the method comprising:

receiving an Internet Protocol (IP) data packet, wherein the IP data packet comprises a router identifier of a router for transmitting the IP data packet, and a first time corresponding to the router identifier, and wherein the first time is predetermined absolute time when the router sends the IP data packet; wherein after receiving and processing the IP data packet, the router sends the IP data packet to a next hop in a routing flow table at the first time;

wherein the router identifier refers to a plurality of router identifiers included in the routing flow table, the routing flow table further comprises an order of the plurality of router identifiers, and the plurality of router identifiers respectively correspond to the first time, wherein the plurality of router identifiers correspond to a plurality of routers;

wherein the IP data packet further comprises a predetermined second time when a router corresponding to a previous router address of a destination IP address jumps to the destination IP address for transmitting the IP data packet.

* * * * *